Feb. 25, 1958  G. D. McKENNY  2,824,315
RELEASABLE COUPLING DEVICE
Filed March 15, 1955  2 Sheets-Sheet 1

INVENTOR.
George D. McKenny
BY
Attorneys

Feb. 25, 1958

G. D. McKENNY 2,824,315

RELEASABLE COUPLING DEVICE

Filed March 15, 1955

INVENTOR.
George D. McKenny
BY

United States Patent Office 2,824,315
Patented Feb. 25, 1958

2,824,315

RELEASABLE COUPLING DEVICE

George D. McKenny, Vallejo, Calif.

Application March 15, 1955, Serial No. 494,587

24 Claims. (Cl. 9—33)

(Granted under Title 35, U. S. Code (1952), sec. 266)

The invention described herein may be manufactured and used by or for the Government of the United States of America for governmental purposes without the payment of any royalties thereon or therefor.

The present application is a continuation-in-part of my copending application Ser. No. 171,173, filed June 29, 1950, now abandoned.

This invention relates to a releasable coupling device which is particularly useful for embodiment in a device for releasing submerged life rafts or the like automatically at a predetermined hydrostatic pressure and which can also be operated manually.

Life saving release devices in common use have given erratic results. For example, life raft release devices designed to release at predetermined depths of submergence have frequently failed to function in actual practice. Some of these devices fail to operate because the tension on the lashings, especially when the raft is subjected to buoyant forces, introduces an excessive amount of frictional force between sliding surfaces of the movable parts of the release mechanism.

Accordingly, it is an object of the present invention to provide a releasable coupling device which in its releasing function is relatively unaffected by friction forces resulting from the load applied to the coupling.

Additional objects will be apparent after reading the following description, as illustrated with reference to certain preferred embodiments only.

The release mechanism of the present invention comprises two coupling members and a movable pin. Each of the coupling members is provided with means to facilitate attachment of lashing lines. The coupling members are attached together by virtue of the interlocking engagement of a latching dog, movably mounted on one of the coupling members, with a strike or hook-like latching portion on the other coupling member. The interlocking engagement is maintained by the pin serving as a cotter key or gib to wedge or key the dog against the strike and is broken, when the pin is displaced from keying position, by so locating the line of pull of the lashing lines relative to the dog that the tension disengages the dog from the strike. This arrangement is capable of general utility in couplings and is of particular use in life raft release couplings in which case the pin is adapted for displacement either manually, or automatically by means actuated by hydrostatic pressure when the release mechanism is submerged to a predetermined depth in fluid. According to this invention the pin is primarily under transverse compression and thus readily displaced while the coupling members are under tension as distinguished from prior art devices, such, for example, as that of U. S. Pat. No. 2,360,848, where the pin is primarily under bending and shear stresses, making it very difficult to displace while under load.

Conveniently, and especially for the sake of symmetry and to avoid undesired torques and forces, the principles of the invention can be embodied in a construction where one of the coupling members has a bifurcated portion providing a pair of coupling arms and the other coupling member carries a pair of pivoted dogs, each to engage one of the coupling arms. In this construction the pin is positioned between the dogs and the location of the attachment of the lashing lines to the coupling members, is such that the line of pull on the coupling members passes through the center of the pin. Each of the pivoted dogs, as it pivots, swings in and thus defines a plane of motion. If the planes of motion of the two dogs are coincident, the dogs may be said to be coplanar or the dogs may be said to move in one and the same plane. When at least two dogs are under consideration, it is thus always permissible to refer to the planes of motion of the dogs, and when the planes of motion of the dogs are coincident, it is thus also permissible to refer to the plane of motion of the dogs.

The pin is preferably carried by one of the coupling members but can be mounted independently of them. It is made to have relatively wide and narrow sections and is displaceable in a direction transverse to the planes of pivoting movement of the dogs to dispose a wide section between the dogs to wedge them apart and into engagement with the coupling arms or to dispose a narrower section between them to allow the tension to urge the dogs toward each other and thus out of engagement with the coupling arms. The manual operation of the pin is facilitated by providing it with a portion projecting away from the main body of the mechanism and terminating in a button head or knob. The automatic operation of the pin is facilitated by mounting the pin directly on the diaphragm of a hydrostatic pressure actuator. The actuator can be carried by one of the coupling members or mounted independently.

Particularly preferred embodiments of the invention are illustrated in the accompanying drawings, wherein Fig. 1 is a plan view, partly cut away, showing the coupling members of one preferred embodiment linked together, and showing in phantom, the position of the dogs relative to the pin and the arms when the coupling members are disengaged;

Figure 9:
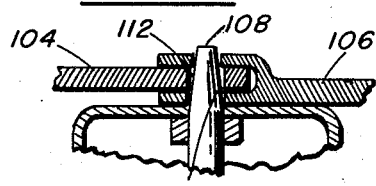
Figure 10:
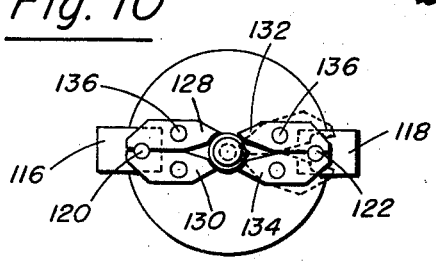
Figure 11:
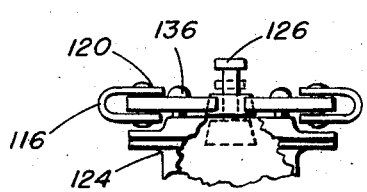

Fig. 9 is a more or less schematic, fragmentary view, partially in cross section, of a coupling similar to that of U. S. Pat. No. 2,360,848, wherein the release pin is bodily interposed between the coupling members as in the manner of a clevis pin and is provided with tapers according to the present invention;

Fig. 10 is a a more or less schematic plan view, partly broken away, of an embodiment of the invention using four pivoted dogs; and Fig. 11 is a fragmentary elevation view of the embodiment of Fig. 10.

In the device illustrated in the drawings the two coupling members or lashing plates are designated as 10 and 11. These can be made of several plates secured together, such as by welding or riveting. The lashing plates are provided with lashing eyes 12 and 13, through which are passed the flexible lashing-down members of the buoyant life saving device or life raft. Plate 10 is provided with a bifurcated portion, the arms or limbs 14 thereof each terminating in a hook-like or latching portion 15. Each hook-like portion 15 has an offset portion 16 constituting a strike for latching engagement which is adapted to cooperate with offset portions 17 of dogs 18 to hook therewith and to link plates 10 and 11 together when the dogs 18 are pressed against the inner surfaces of arms 14. The dogs 18 are pivoted to plate 11 on rivets 19, and have beveled edges 20 to guide the dogs away from pin 21, and toward arms 14, when they are inserted between arms 14 to link together plates 10 and 11. Pin 21, dogs 18, rivets 19, and plates 10 and 11, are preferably constructed of corrosion-resistant metals, but any or all of these parts may be made of plastics or other non-corrodible materials of suitable strength.

Pin 21 is made up of a wide portion 22 and a relatively more narrow portion 23. When pin 21 is in the raised position, as shown in Fig. 2, the wider portion 23 is positioned between the inner surfaces 24 of dogs 18. and prevents the dogs from becoming disengaged by forcing the dogs against the arms 14. When pin 21 is depressed, as described below, so that portion 23 is adjacent inner surfaces 24 of dogs 18, and a tension is applied to plates 10 and 11, there is a line of pull passing through the center of pin 21 and the centers of eyes 12 and 13. The pull by the lashing line in eye 13 on the plate 11 is transmitted to the dogs 18 through rivets 19 and is opposed by a equal and opposite pull of the lashing line in eye 12 on plate 10 transmitted by surface 16 abutting against surface 17. Since the dogs 18 are capable of turning about the rivets 19, it is appropriate to consider whether or not a torque exists on the dogs that might tend to turn them about the center of the rivets 19. According to the conventional principles of statics, half the tension of the lashing lines can be considered to be exerted along ZY and, for simplification, the equal and opposite reaction XR can be considered to act at the point X in the opposite direction. There does exist, then, a torque on e. g., the lower dog 18 measured by the product of the reaction force (half the tension) multiplied by the vertical distance $d$ between vectors ZY and XR. This torque tends to produce clock-wise rotation of the lower dog as viewed in Fig. 1. There is, of course, no torque produced by the force action along ZY since it has no moment arm about Z. Substantially identical torques act on each of the dogs 18 and move them toward pin 21 causing offsets 17 to clear offsets 16 and causing dogs 18 to become unhooked or disengaged from latching portion 15 and arms 14, respectively, as shown in phantom in Fig. 1. The aforementioned torque has been found to be sufficient to unhook dogs 18, in actual practice, when the angle at X for each dog, and the cooperating angles on the offset portions 16, are made about 90°, or preferably slightly greater than 90°.

When the portion 22 of the pin is in position to maintain the dogs in engagement it must exert at its point of contact W with the dogs a force of such magnitude that it will, when multiplied by the distance D exert a torque on the dog sufficient, when combined with the rather small torque produced by the friction force along the interface 16—17, to just balance the aforementioned reaction torque. Thus it can be seen that, neglecting the probably insignificant friction torque, the actual compressive force on portion 22 of the pin 21 will be equal to approximately half the tension of the lashing lines multiplied by the ratio $d/D$. This is far less than in certain prior art devices where the displaceable pins are subjected to bending and shear under loads of at least half the tension in the lashing lines.

Pin 21 has a narrow portion 25, which is passed through a washer 26, a flexible diaphragm 27, and a special washer 28, and has an intermediate threaded portion 29. Nut 30 secures pin 21 to flexible diaphragm 27. The diaphragm 27 is preferably composed of synthetic rubber or elastomer, but can suitably be made of leather or other flexible material. Cylinder 31 is a guide for narrow portion 25 of pin 21, and is secured to the bottom of cup 32 by any suitable means. Cup 32 is secured to circular spacer plate 33 by means of machine screws 34 that pass through flange 35 of cup 32, to form a fluid-tight compartment 37. Compartment 37 is bounded by cup 32 and diaphragm 27. Machine screws 34a are threaded into plate 10, and secure the assembly of cup 32, diaphragm 27, and spacer plate 33 to plate 10. The assembly could just as well, of course, be secured instead to the coupling member 11.

Disposed about guide 31, and the narrow portion 25 of pin 21, is a spring 40 that is preferably loaded to about 25 pounds for a diaphragm 27 having an effective area of about 5 square inches and a cup 32 having a diameter of about 3 inches and a height of about 1.25 inches. Spring 40 is designed to oppose the tendency of hydrostatic pressure operating through port holes 41 drilled through spacer portion 36 of plate 33, until the total force acting upon diaphragm 27 exceeds that of a predetermined value. When the release device is submerged to a depth of about 30 to 40 feet in the sea, and the total force acting upon diaphragm 27 exceeds the predetermined value, diaphragm 27 is forced into chamber 37, moving pin 21 into guide 31 until the narrow portion 23 is adjacent the inner surfaces 24, and nut 30 contacts the top of guide cylinder 31 as a stop.

The knob 43, on top of the pin 21, is provided for conveniently releasing the device manually whenever desired. Such release is accomplished by simply pressing the knob 43 downward until the smaller diameter portion 23, of pin 21, is adjacent the inner surfaces 24 of the dogs 18, while at the same time, of course, the lashing plates 10 and 11 are under tension. Thus the method of manually releasing the instant device is much more simple than that of certain prior art devices which involve the application of a pulling force to a sealed pin subject to shear sufficient not only to break the seal but also to overcome the forces due to the deformation by shear. It will be understood that although the pin 21 is described as being actuated by a pull of the diaphragm 27 and a push on the knob 43, either or both of these actions can be reversed within the scope of the invention. If like actions are desired from both ends, i. e. a pull from both ends or a push from both ends, this can be facilitated by making the pin 21 with two narrow portions 23, one on either side of the wide portion 22.

*Operation*

Thus in actual practice the device can be released in an emergency by pressing the knob as described above. However, in case there is insufficient time to manually release the device before the vessel sinks, the device will release automatically at a predetermined depth of submergence due to the action of hydrostatic pressure on the diaphragm 27. Water under pressure will enter chamber 45 through port holes 41, and will exert a pressure of increasing magnitude upon diaphragm 27 as the vessel sinks to a greater and greater depth. When the vessel has submerged to the predetermined depth, the hydrostatic pressure will be of sufficient magnitude to force diaphragm 27 into chamber 37 as described above. When the narrow portion 23 of pin 21 is adjacent inner surfaces 24 of dogs 18, the dogs will be forced inward against the narrow portion 23, and out of engagement with arms 14, as described previously.

The tension acting on lashing plates 10 and 11, as a result of the original lashing tension, and of the additional tension produced in the lashings as a result of the action of buoyant force on the submerged life saving devices, causes the disengaged lashing plates 10 and 11 to pull apart, and thus release the life saving devices, which are rapidly buoyed to the surface.

The life saving release device of the invention, by virtue of its structural features, can be relied upon to operate satisfactorily in actual use because the pull to which dogs 18 are subjected, has only a slight tendency to increase the frictional force to be overcome by the pin 21. As a consequence of this feature, the device of the invention operates, as described above, to release dogs 18 from offset portions 17, when the hydrostatic pressure on diaphragm 27 approaches the predetermined value, regardless of the magnitude of the force tending to pull the lashing plates 10 and 11 apart.

The predetermined hydrostatic pressure, or depth of submergence, at which pin 21 will be drawn into guide 31 sufficiently to release lashing plates 10 and 11, is determined by the compressive force required to compress coil spring 40, plus the force required to overcome frictional forces acting upon the pin 21, at the surfaces 24 of dogs 18.

The single eye 12 and 13 on each lashing plate 10 and 11, as contrasted to a double eye used in some devices, automatically provides for a uniform, controlled load on dogs 18 during submergence of the life saving device, unaffected by the method of lashing. Regardless of whether one or two strands of lashing cord are used in each lashing plate eye, there is in each case the same direction of pull operating on the lashing plates of the instant device through the centers of the lashing plate eyes 12 and 13. In this manner, variables resulting from changes in the direction of pull, that cause erratic operation of other release devices, are eliminated in the instant device of the invention.

Furthermore, the instant release device does not require the use therein of a vent opening to avoid a false release of the lashing plates as a result of sharp temperature decreases. By reason of the fact that the frictional forces acting upon pin 21 are relatively small in the instant device, as compared to prior art devices, a stronger spring 40 can be used in the instant device than if the frictional forces were great. For example, in one embodiment of the invention, a spring loaded to 25 pounds is used. A temperature decrease from about 110° to −30° F. (140° F.) would cause a net pressure of about 3.2 pounds per square inch on the top side of diaphragm 27. Diaphragm 27, having an effective area of about 5 square inches in said embodiment, the total force acting downward thereon, and tending to compress the spring, amounts to only about 16 pounds, which is appreciably less than the 25 pounds required to compress the spring.

Figure 1:
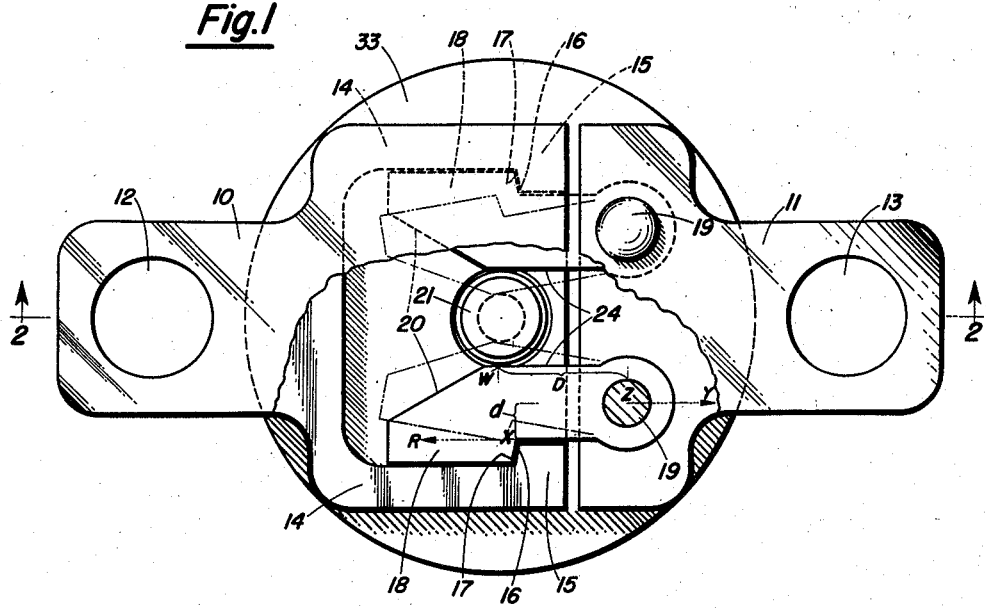
Figure 2:
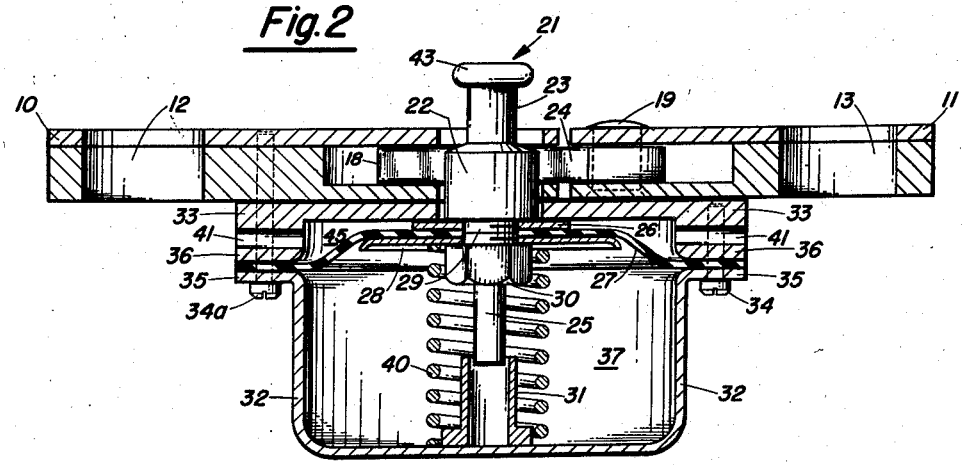
Fig. 2 is a cross-sectional view taken along the line 2—2 of Fig. 1, showing the relatively wider and the relatively more narrow portions of the pin and the relation of these portions to the inner surfaces of the dog.

In the form of the invention shown in Figs. 1 and 2, it is apparent that as the load on pieces 10 and 11 is increased, the torque on the dogs 18 is increased, thereby increasing the inward forces on the dogs 18 against the pin 21 at the points of contact on the surface 22. This results in more friction between the dogs 18 and the pin 21, thus requiring more pressure on the diaphragm 27 to force the pin 21 down to allow the dogs to disengage. This means that a ship on which this coupling is used to lash down life rafts would have to sink to a greater depth to release more buoyant rafts. If this ship should sink in relatively shallow water, small sized rafts of relatively little buoyancy would be released but large sized rafts of relatively considerable buoyancy might not be released since the greater buoyancy of the latter would increase the tension on the lash lines and thus ultimately increase the friction between the dogs 18 and the pin 21. One solution to this problem is to design different couplings for different rafts. However, another preferred solution has been found which will accomplish the desired result of having all rafts, large and small, release as soon as possible.

The key to this preferred solution lies in the realization that when a pin or the like is used to maintain in coupling relation the members of a coupling by being interposed between certain portions of the coupling members to prevent relative disengaging motion between those portions (as is, for example, applicant's pin 21 between dogs 18 or the pin 17 in the aforementioned U. S. Pat. No. 2,360,848 between sections 10 and 11) and being subjected by them to compressive forces, there exist, as previously mentioned, friction forces which oppose motion of the pin in the direction of its displacement transverse to the direction of the compressive forces but these friction forces can be opposed in part, more or less exactly balanced, or actually overbalanced within certain limits, in each case by inclining at an appropriate angle to the direction of displacement of the pin one or more of those surfaces of the pin which are in compressive contact with the portions of the coupling members used to effect coupling engagement. By this means a component of the compressional force exerted by one or more of the coupling member portions on the pin is aimed in such a direction as to assist displacement of the pin in opposition to the friction forces.

Figure 3:
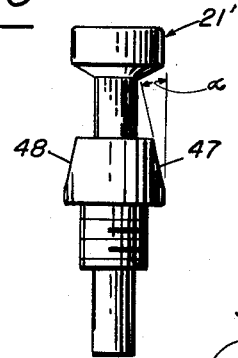
Fig. 3 is an elevation view of a modified form of the pin.
Figure 4:
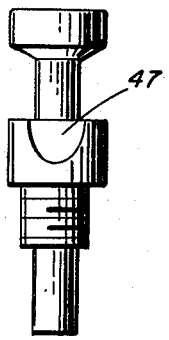
Fig. 4 is another elevation view of the pin of Fig. 3 rotated about its longitudinal axis 90° from the position in Fig. 3.

A specific preferred embodiment for controlling the friction problem is shown in the form of a modified release pin 21' exhibited in Figs. 3 and 4 and having tapers 47 and 48 on opposite sides. In this embodiment it is assumed that the object is to provide a release pin, the force required for the displacement of which is substantially independent of the compressional forces exerted on it by the dogs and hence is independent of the load on the coupling device in which it is used. When such a pin as 21' is used in the embodiments similar to that of Figs. 1 and 2, these surfaces 47 and 48 constitute the surfaces of the pin which engage the dogs and wedge them apart. It is known that for two bodies in frictional engagement with one another, there exists a coefficient of friction which is characteristic for the particular materials of which the two bodies are made. Each surface 47 and 48 is inclined at an angle to the direction of displacement (assumed to be vertical in Figs. 3 and 4) of the pin such that the tangent of this angle is equal to the coefficient of friction for the particular surface of the taper coacting with its respective dog. This angle is labelled as α for the surface 47 in Fig. 3 and is also known as the angle of friction for the particular two bodies. When the wedging surface of the pin in contact with the dog is thus inclined to the direction of movement of the pin at an angle equal to the angle of friction for that surface and its contacting dog, it then possesses the remarkable property that, assuming that the coefficient of friction remains constant (and this is approximately true to the extent required for practical purposes), the force required to displace the pin is substantially independent of the force exerted by the dogs on the pin. Thus, substituting a pin such as 21' for the pin 21 in the embodiment of Figs. 1 and 2, as the load on elements 10 and 11 is increased, thus increasing the force exerted by the dogs 18 on the pin 21', no increase in pressure on the diaphragm 27 is required to pull the pin 21' down to release the dogs. Considering the pin 21' as oriented in Fig. 2, the downward vertical component of the normal force exerted by each dog 18 on its respective tapered surface of the pin 21' tends to push the pin down with just sufficient force to counteract the vertical component of the friction force between the pin 21' and that dog tending to oppose downward motion of the pin when such motion is impending. This can be stated in another way: the resultant force exerted, at the time when displacement of the pin 21' is impending, by each dog 18 on the pin 21' as oriented in Fig. 2 is horizontal and therefore has no vertical component either to aid or to oppose vertical displacement of the pin 21'.

Ordinarily, the two dogs, in such an embodiment as that in Figs. 1 and 2, would be of the same material and therefore the inclination of the wedging contact surfaces 47 and 48 to the direction of movement of the pin would be identical. If the two dogs, for some peculiar reason, should be of different material, then the taper of each wedging surface should be made so that it is inclined to the direction of movement of the pin at the angle of friction for that surface with its respective dog. Although the aforementioned property of a contact surface tapered as described holds theoretically only when the coefficient of friction is constant and the surface is inclined at precisely the corresponding angle of friction, nevertheless, experience has shown that the construction is adequate for all practical purposes if the contact surfaces are inclined to the direction of displacement of the pin at an angle whose tangent is substantially equal to the coefficient of friction for the pin on the dog.

In the foregoing example a symmetrical arrangement has been explained wherein each of the opposed surfaces 47 and 48 is inclined at the angle of friction for the materials of the respective surface and its dog. However, the same result can be obtained by using any desired combination of angles which will cause, when displacement of the pin is impending, the algebraic sum of the components along the direction of displacement of the pin of the forces exerted by the dogs on the pin to be zero, or, in other words, the resultant force of the dogs on the pin to be normal to the direction of displacement of the pin. The general mathematical relation which holds can be deduced easily from a consideration of the case of two opposed dogs used with the pin of Fig. 3, for example. Let the inclination of the surface 47 from the vertical (i. e. from the direction of displacement of the pin as viewed in Fig. 3) be $\beta_1$ (and not, for the moment, $\alpha$ as labelled); let the angle of friction for the surface 47 with its respective dog be $\alpha_1$; similarly let the inclination from the vertical of surface 48 be $\beta_2$ and its angle of friction with its dog be $\alpha_2$. Then for the situation where it is desired to make the net vertical components of the forces of the dogs on the pin at the time of impending motion of the pin equal to zero, it can be shown that the criterion is that $$\beta_1 = \alpha_1 + \alpha_2 - \beta_2$$

If the dogs are of identical material, then $\alpha_1 = \alpha_2$ which may then be called $\alpha$ and the equation reduces to $$\beta_1 = 2\alpha - \beta_2 \tag{1}$$

From this it can be seen that if 47 is inclined to the vertical at the angle $\alpha$, its angle of friction with its dog (i. e. if $\beta_1$ is made equal to $\alpha$), then $\beta_2$ must also be made equal to $\alpha$ (i. e. 48 must be inclined at angle $\alpha$ to the vertical). Likewise if, for example, $\beta_1$ is made equal to $2\alpha$ (i. e. 47 is inclined at angle $2\alpha$ to the vertical) then $\beta_2$ must be made equal to zero (i. e. 48 is made exactly vertical), all as viewed in Fig. 3. Obviously, any other values of $\beta_1$ and $\beta_2$ may be chosen which will satisfy the equation.

If, instead of constructing the device so that the force required to depress the pin is independent of the forces exerted by the pin on the dogs, it is desired to make the force required to depress the pin either a decreasing or an increasing function of the load on the coupling, it is only necessary to set appropriate values for the angles in the following equation giving the net component, V, of the forces exerted by the dogs on the pin along the direction of displacement of the pin at the instant of impending motion of the pin, written for simplicity for the case where two dogs act on opposite sides of the pin as in Fig. 3, as:

$$V = P \tan(\beta_1 - \alpha_1) + P \tan(\beta_2 - \alpha_2) \tag{2}$$

which, when $\alpha_1 = \alpha_2 = \alpha$, reduces to $$V = P[\tan(\beta_1 - \alpha) + \tan(\beta_2 - \alpha)] \tag{3}$$

where P is the horizontal force, i. e. the force normal to the direction of displacement of the pin, urging each dog against the pin.

When $\beta_1 > \alpha$ and $\beta_2 > \alpha$, the value of V is positive, indicating a net downward component on the pin, aiding its depression. If either or both of $\beta_1$ and $\beta_2$ are made less than $\alpha$ sufficiently to render the quantity within brackets negative, then V represents a net upward component opposing depression of the pin. It can be seen from this Equation 3 that if $\beta_1 = \beta_2 = \alpha$, there is no vertical component, i. e. the total resultant force of the dogs on the pin is horizontal and the force needed to depress the pin is independent of the load on the coupling.

Figure 5:
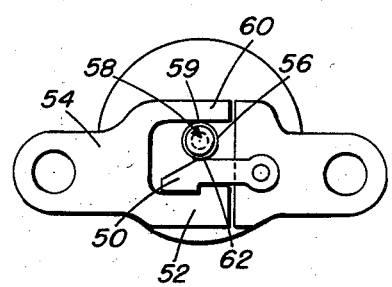
Fig. 5 is a schematic plan view of a coupling in which the release pin is interposed between a dog and a fixed reaction element instead of between opposing dogs.
Figure 6:
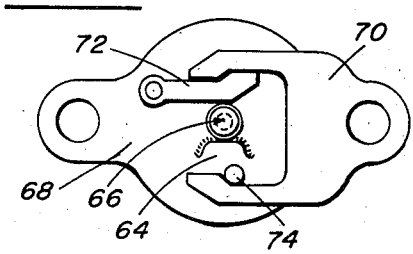
Fig. 6 is a schematic plan view of an embodiment wherein the release pin is mounted on the dog-carrying member of the coupling.

While the foregoing equations were written for the case of a pair of dogs on opposite sides of the pin, the identical equations would apply where one of the dogs is replaced by a fixed reaction element as in Figs. 5 and 6, for example, or where the two inclined surfaces of the pin are acted on by interlocked links, such as surfaces 110 and 112 in Fig. 9 being acted on by links 104 and 106, respectively. Analogous equations can be written for cases using more than two surfaces on the pin and hence more than two dogs and/or fixed reaction elements. An example of such an arrangement appears in Fig. 10 where four dogs and four pin surfaces are involved. To construct such equations it is merely necessary to supply a term for each pin surface and its coacting body similar to the first term on the right hand side of Equation 2.

The value of the net force on a pin of $n$ contact surfaces exerted along the direction of displacement of the pin is given thus:

$$V = \sum_{i=1}^{i=n} P_i \tan(\beta_i - \alpha_i) \tag{4}$$

where $P_i$ is the force on any contact surface of the pin exerted normal to the direction of displacement of the pin, $\beta_i$ is the inclination of that contact surface to the direction of displacement of the pin, and $\alpha_i$ is the angle of friction characteristic for that contact surface coacting with its respective contact element (e. g. dog, reaction element, or link). The tapered surfaces on the pin can be either milled separately as in Fig. 3 or, if a uniform taper on all sides of the pin is desired, the taper can be turned on a lathe. Although the subsequently discussed Figs. 5 through 11 are more or less schematic, it is to be understood that the pin in any of those figures may be tapered, or not, as desired, to obtain the required results from each embodiment.

Although the preferred embodiment of the invention illustrated in Figs. 1 and 2 shows two dogs arranged to pivot in substantially the same plane, it is apparent that, within the scope of the invention, other satisfactory arrangements are possible, some so easily understood as not to require illustration. For example, the dogs need not necessarily move in the same plane nor in planes perpendicular to the direction of displacement of the pin. Thus if the axes of the rivets 19, instead of being parallel, were inclined toward each other either accidentally or intentionally, the device would operate quite as well, assuming, of course, that there is sufficient space among the parts adjacent the dogs to permit the dogs to swing freely. One dog or more than two dogs can be used and the dog or dogs can be arranged for sliding or translational movement rather than rotational or pivoting movement. Also, the locking pin can, as previously suggested, be interposed between a fixed portion of a coupling member serving as a reaction element on the one side and the movable dog or dogs on the other side, rather than being interposed between movable dogs as in the form illustrated in Figs. 1 and 2.

In Fig. 5 there is shown schematically an embodiment of the invention using only one dog. In this modification the dog 50 is wedged into interlocking engagement with the hook portion 52 of the coupling element 54 by the enlarged portion 56 of pin 58. Instead of being supported only from one end, as would be possible, by a guide stem similar to 25 in Fig. 2 and/or by being clamped to a diaphragm such as 27 in Fig. 2, the pin is provided with a reaction surface 59 of the portion 60 of element 54 opposite the point of contact 62 with the dog. This eliminates bending stresses on the pin. The reaction surface 59 could, of course, just as well be located on the dog-carrying member.

In Fig. 6 is shown schematically an embodiment of the invention wherein the reaction surface 64 for the pin 66 is located on the dog-carrying member 68. In this embodiment the pin is also shown as being mounted on the dog-carrying member, a feature which can be used, if desired, in the other embodiments of the invention. In Fig. 6 the coupling member 70 is illustrated schematically attached to the member 68 by engagement with the dog 72 and with a boss 74 projecting from member 68.

Figure 7:
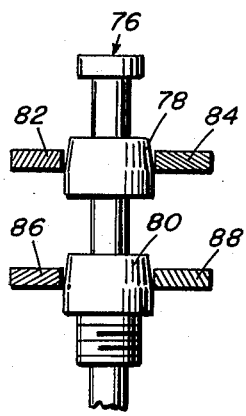
Fig. 7 is a fragmentary view, partially in cross section, of a coupling according to the invention, showing an elevation of a release pin adapted for use with a plurality of dogs spaced from one another, along the direction of displacement of the pin.

In Fig. 7 is shown a fragmentary, more or less schematic view representing several possible alternative constructions embodying the invention, the view being analogous to that which would be obtained by a plane, vertical as viewed in Fig. 1 and passing through the longitudinal axis of pin 21 and thus perpendicular to the plane of the paper. In Fig. 7, the release pin 76 shown happens to be of the tapered variety illustrated in Figs. 3 and 4. The pin 76 is provided with two separate wedging portions 78, 80, being illustrative of a pin to be used to coact with any plurality of dogs spaced from each other along the direction of travel of the pin. More than two such wedging portions can be used if required. The opposing pairs of elements 82, 84 and 86, 88 may represent four dogs, either pivoted or sliding. Alternatively, one of the elements of one of the pairs or one of the elements of each of the pairs may represent a fixed reaction surface, functioning analogously to 59 in Fig. 5, and the remaining elements would be dogs. When the taper feature is used on the wedging surface of the release pin, it may be noted again that it can readily be determined from Equation 4 that if, for example, it is desired fully to compensate for the increase in friction forces with increased load on the coupling, various tapers can be used on opposite sides of the pin. For example (assuming all contact surfaces to be made of similar materials) either two tapers on opposite sides, each inclined at the appropriate angle $\alpha$ could be used or one side could be left straight and the other tapered at the angle $2\alpha$ or any other combination could be used which would satisfy Equation 4 set equal to zero. If such a tapered pin is used in embodiments such as Fig. 5, the dog engages one tapered surface and a fixed reaction element engages the opposite surface, whereas in the opposed-dog construction such as Fig. 1 or certain of the alternatives of Fig. 7, a tapered release pin in use is engaged on both the opposite surfaces by dogs. The effect of Equation 4 can be interpreted from another viewpoint by observing that if, for example, a taper of angle $\alpha$ is applied to only one side of the pin, the other side being left straight, then this compensates for only substantially half of the friction force which would be present at impending motion of the pin when both sides were left untapered.

Figure 8:
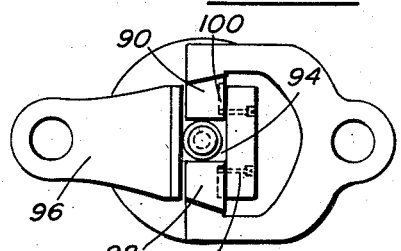
Fig. 8 is a schematic plan view of another embodiment of the invention using sliding dogs.

In Fig. 8 is shown schematically an embodiment of the invention using sliding dogs 90, 92 instead of pivoted dogs. These dogs slide in a channel 94 in coupling member 96 and are prevented from falling free of the member 96 by any convenient means such as retaining screws 98 projecting into but not generally in contact with the walls or bottom of grooves 100 in the dogs. As previously indicated, a fixed reaction surface can be substituted for one of the opposing dogs.

Fig. 9 is similar to a fragmentary section of the essential parts of Fig. 3, U. S. Pat. No. 2,360,848, wherein 104 represents one member of a detachable coupling and 106 represents the other member of the coupling, the two members being held together by a pin 108 carried by and mounted in any suitable manner in the element 106 for displacement relative thereto along the direction of the longitudinal axis of the pin 108. The pin 108 may be provided with a tapered surface 110, and may also be provided with a tapered surface 112 to operate in the same manner as the pin of Figs. 3 and 4, according to the principles hereinbefore explained. When tenison is applied to members 106 and 104, the member 104 bears against taper surface 110 and the left hand portions of the walls of the openings in the bifurcated part of member 106 bear against surface 112.

In Figs. 10 and 11 is shown rather schematically an embodiment representing a coupling made in three major parts: clevis links 116 and 118 having pins 120 and 122 respectively, and body section 124 carrying release pin 126 and, if desired, a hydrostatically-actuated diaphragm, as well as four dogs, 128, 130, 132 and 134, these dogs being pivoted on the body 124 by rivet pins 136. In Fig. 10, the upper three-quarters of each clevis link 116 and 118 has been cut away to show how the dogs engage pins 120 and 122. When the release pin 126 is depressed to the dotted line position in Fig. 11, while the coupling is under tension, the pairs of dogs swing on their pivots, as illustrated in the dotted position of dogs 132 and 134, and thus release their respective clevis links to which lash lines or the like are attached.

Obviously many modifications and variations of the present invention are possible in the light of the above teachings. It is therefore to be understood that within the scope of the appended claims the invention can be practiced otherwise than as specifically described.

What is claimed is:

1. A coupling mechanism comprising a first coupling member having a coupling arm, a second coupling member having a dog, said coupling arm and said dog being provided with latching portions adapted to cooperate in interlocking engagement to link said coupling members together, those inter-engaging surfaces of said dog and said coupling arm which are involved in said interlocking engagement being, at their point of contact, in all positions of their engagement inclined at a substantial angle to the direction of motion of the dog at the point of contact, a pin mounted for motion in a direction transverse to the plane of motion of said dog and displaceably positioned adjacent said dog in a manner to wedge said dog into interlocking engagement with said arm, and hydrostatic pressure actuator means operatively connected to said pin to move it out of wedging position.

2. The mechanism of claim 1 wherein that surface of said pin which is in wedging contact with said dog is inclined to the direction of motion of said pin at an angle substantially equal to the angle of friction of the interacting surfaces of said dog and pin.

3. A coupling mechanism comprising a first coupling member having a bifurcated portion including a pair of spaced coupling arms, a second coupling member having a pair of pivoted dogs spaced in relation to each other and adapted to be fitted in interlocking engagement between the coupling arms of said first coupling member, those inter-engaging surfaces of each of said dogs and its respective coupling arm which are involved in said interlocking engagement being, at their point of contact, in all positions of their engagement inclined at a substantial angle to the direction of motion of, respectively, each of said dogs at its point of contact, a pin mounted for motion in a direction transverse to the planes of motion of said dogs and positioned between the dogs of said second coupling member to wedge said dogs into interlocking engagement with said coupling arms, and hydrostatic pressure actuator means operatively connected to said pin to move said pin out of wedging position.

4. The mechanism of claim 3 wherein each surface of the pin which is in wedging contact with a dog is inclined to the direction of motion of the pin at an angle substantially equal to the angle of friction of that surface with its respective dog.

5. A coupling mechanism comprising a first coupling member having a latching portion, a second coupling member carrying pivoted thereon a dog movable between a position of interlocking engagement with said latching portion to link said coupling members together and a position of disengagement from said latching portion; the inter-engaging surfaces of said dog and said latching portion being disposed relative to the pivot axis of said dog so that the force exerted through said surfaces by said first coupling member on said dog produces a torque on said dog in the sense tending to urge it from the engagement position toward the disengagement position; and a pin mounted for displacement in a direction transverse to the plane of motion of said dog to wedge said dog into interlocking engagement with said latching portion.

6. A coupling mechanism comprising in combination a first coupling member carrying a coupling arm, a second coupling member carrying a dog, said coupling arm and said dog being provided with latching portions adapted to cooperate in interlocking engagement to link said coupling members together, said dog being movable between engaged and disengaged positions to effect and to disestablish said interlocking engagement, those inter-engaging, surfaces of said dog and said coupling arm which are involved in said interlocking engagement being, at their point of contact, in all positions of their engagement inclined at a substantial angle to the direction of motion of the dog at the point of contact, and a pin displaceably positioned adjacent said dog in a manner to wedge said dog into interlocking engagement with said arm, said pin being mounted for displacement in a direction transverse to the plane of motion of said dog to accomplish and to disestablish said wedging.

7. The mechanism of claim 6, wherein said pin is composed of a wider portion for wedging said dog into interlocking engagement with said arm and a relatively more narrow portion to permit freeing said dog from said engagement, and said pin is operatively connected to hydrostatic pressure actuator means for moving said pin in said transverse direction.

8. The mechanism of claim 6 wherein that surface of the pin which is in wedging contact with the dog is inclined to the direction of displacement of the pin at an angle substantially equal to the angle of friction of the interacting surfaces of the dog and pin.

9. A coupling mechanism comprising in combination a first coupling member carrying a bifurcated portion having a pair of spaced coupling arms, a second coupling member carrying a pair of pivotable dogs spaced in relation to each other and adapted to be fitted in interlocking engagement between the coupling arms of said first coupling member, those inter-engaging surfaces of each of said dogs and its respective coupling arm which are involved in said interlocking engagement being, at their point of contact, in all positions of their engagement inclined at a substantial angle to the direction of motion of each of said dogs, respectively, at its point of contact, and a pin movably positioned between the dogs of said second coupling member to wedge said dogs into interlocking engagement with the coupling arms of said first coupling member, said pin being mounted for movement in a direction transverse to the planes of motion of said dogs.

10. The mechanism of claim 9 wherein those surfaces of the pin which are in wedging contact with a dog are so inclined to the direction of displacement of the pin that the algebraic sum of the components of the forces exerted by the dogs on the pin in the direction of displacement of the pin is substantially zero.

11. The mechanism of claim 9 wherein each surface of the pin which is in wedging contact with a dog is inclined to the direction of movement of the pin at an angle substantially equal to the angle of friction of that surface with its respective dog.

12. The mechanism of claim 9 wherein said pin is composed of a wider portion for wedging said dogs into interlocking engagement with said arms and a relatively more narrow portion to permit freeing said dogs from said engagement, and said pin is operatively connected to hydrostatic pressure actuator means for moving said pin in said transverse direction.

13. A coupling mechanism comprising in combination a bifurcated coupling member having arms provided with offset portions at the ends thereof and extending inward of said arms, a coupling member carrying two pivotally mounted dogs, each adapted for fitting in spaced relation against the inner surfaces of one of said arms and each provided with an offset portion extending outward of each of said dogs toward said arms to cooperate with the offset portions of said arms to link therewith, those inter-engaging surfaces of each of said dogs and said arms which link with each other being, at their point of contact, in all positions of their engagement inclined at a substantial angle to the direction of motion of, respectively, each of said dogs at its point of contact, and a movable pin positioned between the inner surfaces of said dogs and having a wide portion sufficient to force the outer surfaces of said dogs against the inner surfaces of said arms, said pin having a constricted portion adjacent said wide portion to permit said dogs to move toward the surfaces of said constricted portion sufficiently to become unlinked, said pin being mounted for movement in a direction transverse to the planes of motion of said dogs to bring said wide portion and, alternatively, said constricted portion into operative position, and said pin extending beyond the outer surfaces of said coupling members sufficiently for manual actuation to move said constricted portion of said pin adjacent said inner surfaces of said dogs.

14. The mechanism of claim 13, wherein said pin is operatively connected to a hydrostatic pressure actuator means set to be actuated at a specified hydrostatic pressure to move said pin in said transverse direction.

15. A hydrostatic pressure actuated release mechanism comprising a first coupling member having a pair of substantially co-planar arms in spaced relation to each other, a second coupling member carrying a pair of pivotable co-planar dogs adapted for insertion between the arms of said first coupling member, and a pin disposed between said dogs and mounted for movement in a direction transverse to the plane of pivoting of said dogs in a manner to force each of said dogs into interlocking engagement with one of said arms, those inter-engaging surfaces of each of said dogs and said arms which are involved in said interlocking engagement being, at their point of contact, in all positions of their engagement inclined at a substantial angle to the direction of motion of, respectively, each of said dogs at its point of contact.

16. A hydrostatic pressure actuated release mechanism comprising a first coupling member having a pair of substantially co-planar arms in spaced relation to each other, a second coupling member carrying a pair of pivotable co-planar dogs, each of said dogs being adapted for interlocking engagement with one of the arms of said first coupling member, those inter-engaging surfaces of each of said dogs and its respective arm which are involved in said interlocking engagement being, at their point of contact, in all positions of their engagement inclined at a substantial angle to the direction of motion of, respectively, each of said dogs at its point of contact, and a movable pin mounted for motion in a direction transverse to the plane of motion of said dogs and disposed between the dogs to force each of said dogs into engagement with one of said arms, said pin being operably connected to a hydrostatic pressure actuator adapted to displace said pin from its position between said dogs when said actuator is subjected to a predetermined hydrostatic pressure.

17. A coupling device for releasably securing together two lashing-down members of a buoyant life-saving device comprising a first coupling member having a pair of substantially co-planar arms in spaced relation to each other, a second coupling member having a pair of substantially co-planar dogs pivotally attached to said second member and adapted for insertion between said arms in a manner to tightly fit each dog against the inner surface of one of said arms to cooperate therewith to link the coupling members together, those inter-engaging surfaces of each of said dogs and its respective arm which link with each other being, at their point of contact, in all positions of their engagement inclined at a substantial angle to the direction of motion of, respectively, each of said dogs at its point of contact, a pin mounted for motion in a direction transverse to the plane of motion of said dogs and disposed between said dogs and having a wide portion of sufficient magnitude to hold each of the dogs tightly against the inner surface of one of said arms in the linked position, and having a relatively more narrow portion sufficient to permit the dogs to move toward the center of the pin and become disengaged from said arms, and a hydrostatic-pressure-operated actuator connected to said pin and adapted to bring the more narrow portion thereof adjacent the inner surfaces of said dogs when said coupling device is submerged in water to a predetermined depth.

18. A coupling device for releasably securing together two lashing-down members of a life raft comprising a first coupling member having a pair of substantially co-planar arms in spaced relation to each other, said arms having offset portions extending inwardly, a second coupling member carrying a pair of pivotable substantially co-planar dogs adapted to be inserted between the arms of said first coupling member, said dogs having offset portions extending outwardly to adapt said dogs to link said coupling members together by interlocking engagement of said offset portions of said arms with said offset portions of said dogs, those inter-engaging surfaces of each of said dogs and its respective arm which are involved in said interlocking engagement being, at their point of contact, in all positions of their engagement inclined at a substantial angle to the direction of motion of, respectively, each of said dogs at its point of contact, and a movable pin mounted for motion in a direction transverse to the plane of motion of said dogs and having a wide portion disposed between the dogs to force said dogs into interlocking engagement with said arms, said pin having a relatively more narrow portion adjacent said wide portion, and said pin projecting sufficiently beyond the surface of said dogs to be capable of being manually forced toward said surface a sufficient distance to move said more narrow portion adjacent the inner surfaces of said dogs without the projecting end reaching said surface, and said pin being operably connected to a hydrostatic pressure-operated actuator to move said pin a sufficient distance to dispose said more narrow portion adjacent said inner surfaces of said dogs when said actuator is subjected to a predetermined hydrostatic pressure.

19. The coupling device of claim 18, wherein said pin is operably connected to the flexible diaphragm of a hydrostatic pressure actuator comprising in combination a flexible diaphragm adapted to be forced in a given direction by the action of hydrostatic pressure of a surrounding fluid, and a spring adapted to force said diaphragm in a direction opposite said given direction.

20. A coupling mechanism comprising a first coupling member having a latching portion, a second coupling member carrying a dog movable into interlocking engagement with said latching portion to link said coupling members together, and a pin mounted for displacement in a direction transverse to the plane of motion of said dog to wedge said dog into interlocking engagement with said latching portion, that surface of the pin which is in wedging contact with said dog being inclined to the direction of displacement of the pin at an angle substantially equal to the angle of friction of the interacting surfaces of the dog and pin.

21. The device of claim 20 wherein hydrostatic pressure actuator means is operatively connected to said pin to move said pin out of wedging position.

22. A coupling comprising a first coupling member, a second coupling member, and a pin in engagement with portions of both said members to hold said members in coupling relation, said pin being displaceable in a direction transverse to the direction of the line of pull through said coupling members to release said members from coupling relation, those portions of the coupling member which are in engagement with and exerting compressional forces on said pin to accomplish said coupling relation being in engagement with surfaces on said pin so inclined to the direction of displacement of said pin that the algebraic sum of the components of said forces in the direction of displacement of said pin is substantially zero.

23. A coupling comprising a first coupling member, a second coupling member, and a pin in engagement with portions of both said coupling members to hold said members in coupling relation, those portions exerting compressional forces on certain surfaces of said pin with which they are in contact for accomplishing said coupling relation, said pin being displaceable in a direction transverse to the direction of the line of pull through said coupling members to release said members from coupling relation, and at least one of said contact surfaces of said pin being inclined to the direction of displacement of said pin at an angle other than zero, whereby the effect of the frictional forces existing between said pin and said portions of said coupling members opposing displacement of said pin is reduced.

24. A coupling mechanism of the character described comprising a first coupling member, a second coupling member, said coupling members each having means adapted for interlocking engagement to maintain said members in coupling relation, and a pin mounted for displacement in a direction transverse to the direction of the line of pull through said coupling members to release said members from coupling relation, said pin having a plurality of surfaces subject to compressional forces in directions normal to the direction of displacement of said pin, at least some of said means being in engagement with said surfaces whereby said pin retains said means in interlocking engagement, said plurality of surfaces being so inclined to the direction of displacement of said pin that substantially the following relation holds:

$$\sum_{i=1}^{i=n} P_i \tan(\beta_i - \alpha_i) = 0$$

where $n$ is the total number of said plurality of surfaces, $P$ is the compressional force on a surface normal to the direction of displacement of the pin, $\beta$ is the angle of inclination of that surface to the direction of displacement, and $\alpha$ is the angle of friction characteristic for that surface coacting with the body exerting on it the compressional force $P$.

References Cited in the file of this patent

UNITED STATES PATENTS

| 779,660 | Munn | Jan. 10, 1905 |
| 1,137,863 | Keough | May 4, 1915 |

FOREIGN PATENTS

| 125,855 | Sweden | Aug. 16, 1949 |